US012646825B2

(12) United States Patent
Hastürkoglu et al.

(10) Patent No.: US 12,646,825 B2
(45) Date of Patent: Jun. 2, 2026

(54) ANTENNA AND ANTENNA ARRAY

(71) Applicant: Telefonaktiebolaget LM Ericsson (publ), Stockholm (SE)

(72) Inventors: Sertan Hastürkoglu, Munich (DE); Andreas Vollmer, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 122 days.

(21) Appl. No.: 18/839,468

(22) PCT Filed: Feb. 25, 2022

(86) PCT No.: PCT/EP2022/054798
§ 371 (c)(1),
(2) Date: Aug. 19, 2024

(87) PCT Pub. No.: WO2023/160804
PCT Pub. Date: Aug. 31, 2023

(65) Prior Publication Data
US 2025/0174894 A1 May 29, 2025

(51) Int. Cl.
*H01Q 1/24* (2006.01)
*H01Q 1/52* (2006.01)
(Continued)

(52) U.S. Cl.
CPC ............. *H01Q 1/246* (2013.01); *H01Q 1/521* (2013.01); *H01Q 5/42* (2015.01); *H01Q 5/48* (2015.01);
(Continued)

(58) Field of Classification Search
CPC .......... H01Q 1/246; H01Q 1/52; H01Q 1/521; H01Q 1/523; H01Q 5/40; H01Q 5/42;
(Continued)

(56) References Cited

U.S. PATENT DOCUMENTS 9,698,486 B2 7/2017 Shooshtari et al.
2018/0351246 A1* 12/2018 Yu .......................... H01Q 21/26
(Continued)

FOREIGN PATENT DOCUMENTS

KR 102125803 B1 6/2020
WO 2020057498 A1 3/2020

OTHER PUBLICATIONS

International Search Report and Written Opinion for International Patent Application No. PCT/EP2022/054798, mailed Oct. 17, 2022, 11 pages.
(Continued)

*Primary Examiner* — Robert Karacsony
(74) *Attorney, Agent, or Firm* — Withrow & Terranova, PLLC

(57) ABSTRACT

An antenna has a radiator head, a support, and a reflector, wherein the radiator head comprises at least one radiator, the reflector comprises a ground plane, and the support supports the radiator head. A balun structure having a half for each of the radiation sections is provided, wherein each of the halves of the balun structure comprises a main line, an inductive line and a capacitance. The capacitance comprises a capacitive area, the main line galvanically connects the respective radiation section of the radiator to the capacitive area of the capacitance, and the inductive line extends from the main line and is galvanically connected to the ground plane.

Further, an antenna array and a mobile communication cell site are shown.

18 Claims, 7 Drawing Sheets

(51) Int. Cl.

| | |
|---|---|
| ***H01Q 5/42*** | (2015.01) |
| ***H01Q 5/48*** | (2015.01) |
| ***H01Q 19/10*** | (2006.01) |
| ***H01Q 21/26*** | (2006.01) |
| ***H01Q 25/00*** | (2006.01) |

(52) U.S. Cl.
CPC ........... *H01Q 19/108* (2013.01); *H01Q 21/26* (2013.01); *H01Q 25/001* (2013.01)

(58) Field of Classification Search
CPC ........ H01Q 5/48; H01Q 19/108; H01Q 21/24; H01Q 21/26; H01Q 21/28; H01Q 25/001; H01Q 25/002
See application file for complete search history.

(56) References Cited

U.S. PATENT DOCUMENTS

| | | | | |
|---|---|---|---|---|
| 2021/0328365 | A1 | 10/2021 | Zhang et al. | |
| 2021/0408672 | A1 | 12/2021 | Lv et al. | |
| 2024/0021989 | A1* | 1/2024 | Liversidge ............. | H01Q 1/521 |

OTHER PUBLICATIONS

Meinke, H., et al., "Taschenbuch der Hochfrequenztechnik," book excerpt, 1968, Springer-Verlag Berlin Heidelberg 1968, pp. 509-514 (no translation).

* cited by examiner

ANTENNA AND ANTENNA ARRAY

This application is a 35 U.S.C. § 371 national phase filing of International Application No. PCT/EP2022/054798, filed Feb. 25, 2022, the disclosure of which is incorporated herein by reference in its entirety.

TECHNICAL FIELD

The invention relates to an antenna for a mobile communication cell side, an antenna array as well as a mobile communication cell side.

BACKGROUND

Multiband antenna arrays are known in the art. In such antenna arrays, a first array of first antennas designed for a first frequency range are interleaved with a second array of second antennas designed for a second frequency range. It is desirable that the antennas, in particular the radiators of the antennas, have no influence on each other. Usually, antennas designed as half wavelength dipoles are used. However, the common mode resonance does occur at a fourth of the wavelength of the design frequency. This means that a common mode resonance of a low-mid band antenna designed for the frequency range between 1.4 GHz and 2.7 GHz lies fully within the frequency range of a low band antenna designed for the frequency range of 700 to 960 MHz, leading to adverse effects on the beam of the antenna.

Balun structures that shift the common mode resonance frequency to frequencies outside the lower frequency range are known, for example from U.S. Pat. No. 9,698,486 B2 and US 2011/0328365 A1.

However, the structures for shifting the common mode resonance known in the art need a lot of space on the support or on the reflector to which the support is mounted.

SUMMARY

It is thus the object of the invention to provide an antenna with a shifted common mode resonance frequency that is small in size and easy to manufacture.

For this purpose, an antenna, in particular for a mobile communication cell site, is provided. The antenna comprises a radiator head, a support, and a reflector. The radiator head comprises at least one radiator with two radiation sections, the reflector comprises a ground plane, and the support is mounted to the reflector and supports the radiator head above the reflector. A balun structure having a half for each of the radiation sections is provided on the support or in parts on the support and in parts on the reflector, wherein each of the halves of the balun structures comprises a main line, an inductive line and a capacitance. The capacitance comprises a capacitive area capacitively coupled to the ground plane or capacitively coupled to a grounded area which is galvanically connected to the ground plane, the main line galvanically connects the respective radiation section of the radiator to the capacitive area of the capacitance, and the inductive line extends from the main line and is galvanically connected to the ground plane.

By providing a half of the balun structure for each of the radiation sections and forming a capacitance area that receives the end of the main line, the common mode resonance is shifted while the antenna is very compact in size. By using the symmetrical balun approach also a better electrical performance with respect to radiation characteristics and isolation between both polarizations is achieved.

The capacitance and the inductive line of each half may be located electrically between the electrical connection of the respective main line with the respective radiation section, in particular the entire main line, and the electrical connection of the two main lines, in particular which is realized via the ground plane.

For example, the signals from the first antennas of the first frequency range mainly pass through the capacitive area and the signals introduced from the second antennas in the second frequency range do pass mainly through the inductive line instead of the capacitive area.

The balun structures for the different radiation sections are in particular separate from one another.

For example, the inductive line and/or the capacitive area are separate from the main line.

In an aspect, the main line and the inductive line are provided on the support and/or wherein the capacitance is provided on the reflector. This distribution of the parts of the balun structure reduces the space needed on the support and the reflector.

In order to achieve reliable grounding, the capacitance value of the capacitance may be chosen such that the electrical reactance lies below 50Ω, in particular between 10Ω and 40Ω, also allowing impedance matching.

For example, the inductive line comprises a hairpin-shaped section and/or a meander-shaped section, reducing the space needed for the inductive line.

In an embodiment, the support comprises at least one substrate, in particular a PCB, and conductors applied to the substrate, the conductors forming at least parts of, in particular the whole balun structure, in particular wherein the conductors forming at least parts of the balun structure are applied to the same side of the substrate. This way, the support can be manufactured very cost-efficiently.

To simply assembly further, the support may comprise a conductor forming a signal line, wherein the signal line and the balun structure are located on opposite sides of the substrate.

In an embodiment, the substrate of the support extends through the reflector and comprises a coaxial connection in the region below the reflector, so that the reflector is free of conductors, further reducing the costs.

In this context, “below” means that the reflector lies between the coaxial connection and the radiator head.

In an aspect, the grounded area is located on the support on the same side of the substrate as the signal line and wherein the capacitive area is located on the other side of the substrate of the support, in particular wherein the capacitive area is part of the main line, further reducing the space needed for the balun structure.

In order to reliably hold the radiator head, the support has a top end mechanically connected to the radiator head and a bottom end mechanically connected to the reflector, wherein the inductive line branches off the main line at a branching point.

In an aspect, the branching point lies closer to the bottom end than to the top end, in particular the branching point lies in the lower quarter, in particular the lower fifth of the substrate. The location of the branching point near the bottom end increases the frequency range in which the indicative line is effective.

For example, the main line and/or the inductive line end at the bottom end, in particular wherein the main line and/or the inductive line extend into or through the reflector.

In an embodiment, the reflector comprises a substrate, in particular a PCB, and conductors applied to the substrate, the substrate having a first side and a second side opposite to the first side, and the conductors forming at least parts of the balun structure, wherein the ground plane is provided on the first side.

In order to increase the shift of the common mode resonance frequency, the capacitive area may be provided on the first side separate from the ground plane and the grounded area is provided on the second side in a region opposite to the capacitive area. In particular, no ground plane is present in region of the capacitive area.

The galvanic connection between the grounded area and the ground plane may be provided by a via through the substrate.

For example, the first side is the bottom side facing away from the radiator head and the second side the top side opposite to the first side.

In an embodiment, the main line and the inductive line both extend to the first side of the reflector and/or wherein the main line and the inductive line are soldered to the first side of the reflector, in particular wherein the main line is soldered to the respective capacitive area and the inductive line is soldered to the ground plane. Manufacturing is simplified this way, as soldering has to be performed only on the first side of the substrate.

In order to reduce costs further, the parts of the balun structures of the radiation sections of the same radiator that are provided on the support may be located on the same substrate, in particular on the same side of the substrate.

In an aspect, the balun structures are line symmetric to one another with respect to a center line of the substrate extending from the top end to the bottom end of the substrate, increasing the symmetry and thus improved radiation performance.

For example, the parts of the balun structures of the radiation sections of the same radiator that are provided on the reflector are located on the same substrate of the reflector, so that only one reflector is necessary.

In an embodiment, the radiator head comprises two radiators, in particular the radiator head being a dual polarized radiator, wherein the support comprises a substrate for each radiator, in particular wherein the substrates of the support are arranged perpendicular to one another. By arranging the substrates perpendicular to each other, a very stable yet compact support is achieved.

Both substrates together form a cross when seen in a top view.

In particular, the parts of the balun structures of all radiators that are provided on the reflector are located on the same reflector, in particular on the same substrate of the reflector.

For above mentioned purpose, further an antenna array is provided comprising a plurality of antennas as described above forming a first array for a first frequency range and a plurality of antennas forming a second array for a second frequency range.

The features and advantages mentioned with respect to the antenna also apply to the antenna array and vice versa.

In particular, the first and second array are interleaved with one another and/or the second frequency range lies below the first frequency range.

For example, for each radiator the transmission line to the signal feed may be located between two of the capacitive areas, which are connected to the respective radiator head over the respective two main lines.

Further, for above mentioned purpose, a mobile communication cell site is provided comprising an antenna as described above or comprising an antenna array as described above.

The features and advantages mentioned with respect to the antenna and/or the antenna array also apply to the mobile communication base station and vice versa.

BRIEF DESCRIPTION OF THE DRAWINGS

Further features and advantages will be apparent from the following description as well as the accompanying drawings, to which reference is made. In the drawings.

DETAILED DESCRIPTION

Figure 1:
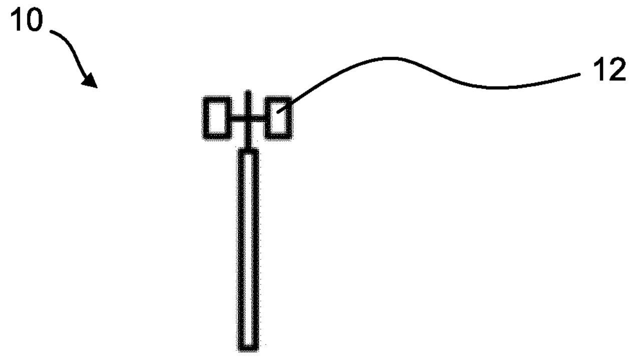
FIG. 1 shows a mobile communication base station according to the invention with at least one antenna area according to the invention comprising an antenna according to the invention.

FIG. 1 shows a mobile communication a cell site 10 schematically. The cell site 10 has at least two antennas arrays 12.

Figure 2:
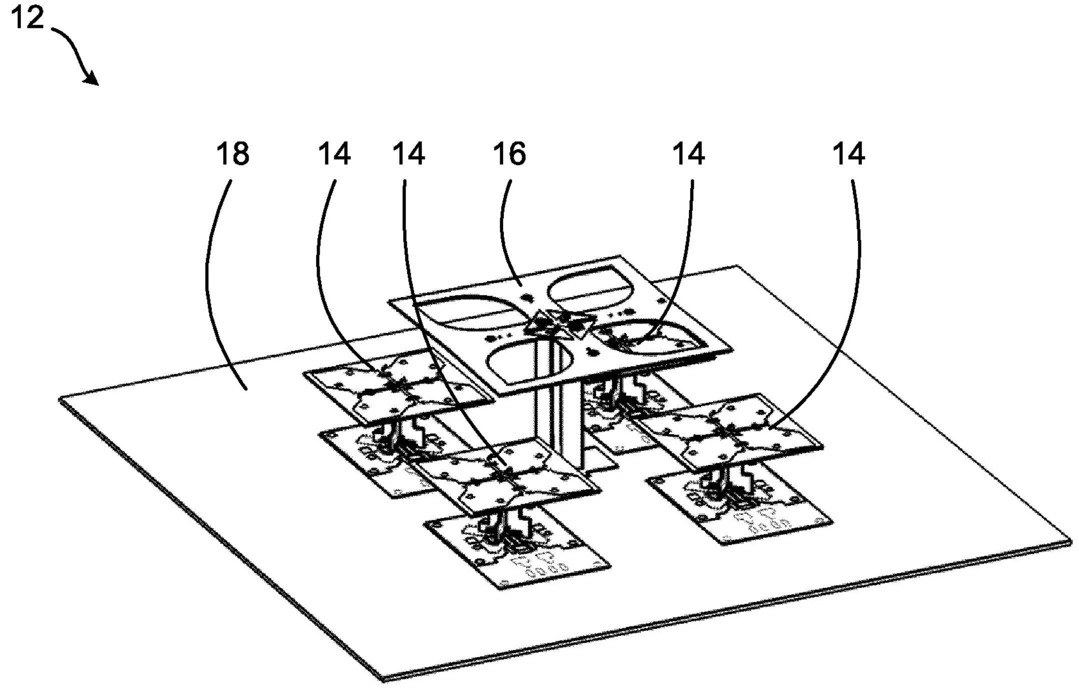
FIG. 2 shows a portion of the antenna array of the mobile communication cell site according to FIG. 1 in a perspective view.

FIG. 2 shows a portion of the antenna arrays 12 in an enlarged view.

Each antenna array 12 comprises a plurality of first antennas 14 and a plurality of second antennas 16.

The first antennas 14 are designed for a first frequency range, for example 1.4 GHz to 2.7 GHz, forming a first array.

The second antenna 16 may be designed for a second frequency range, for example between 700 and 960 MHz, forming a second array.

The first array and the second array are interleaved with one another so that the antennas may overlap when seen in a top view.

Both, the first antennas 14 and the second antennas 16, are mounted on a reflector 18 serving as the common reflector for both arrays. The reflector 18 is considered part of each antenna 14, 16.

Figure 3:
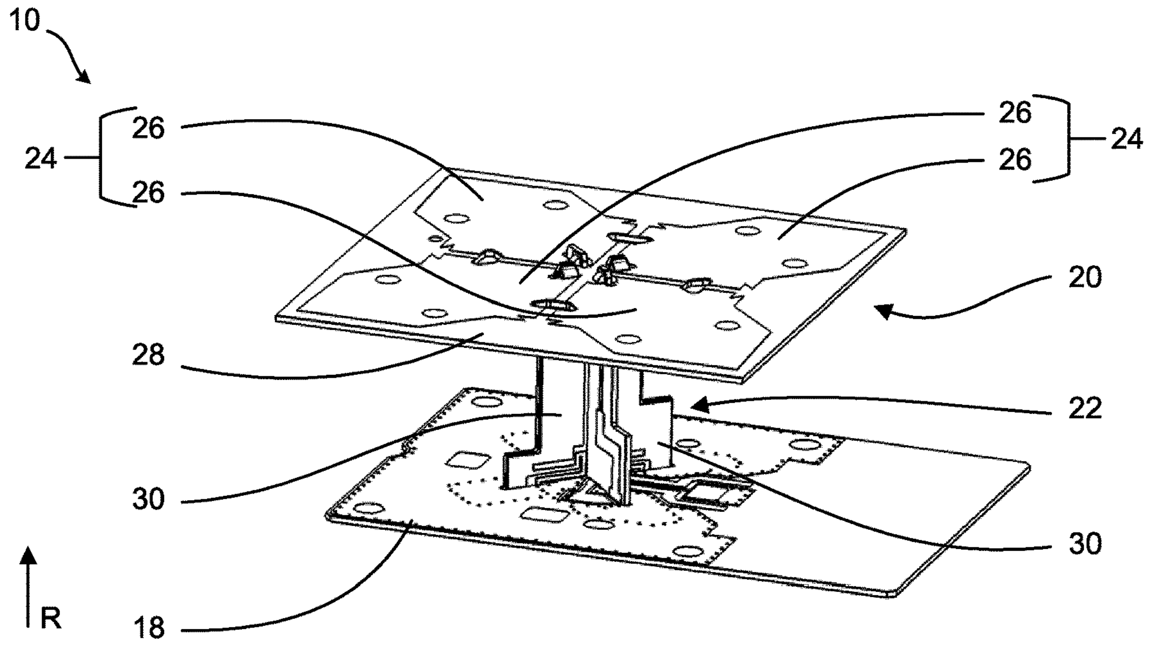
FIG. 3 shows a single antenna of the array of FIG. 2, FIGS. 4, 5 show one substrate of the support of the antenna of FIG. 3 in side views at the different sides.

FIG. 3 shows a perspective view of one of the first antennas 14 which is an antenna according to the invention.

Figure 5:
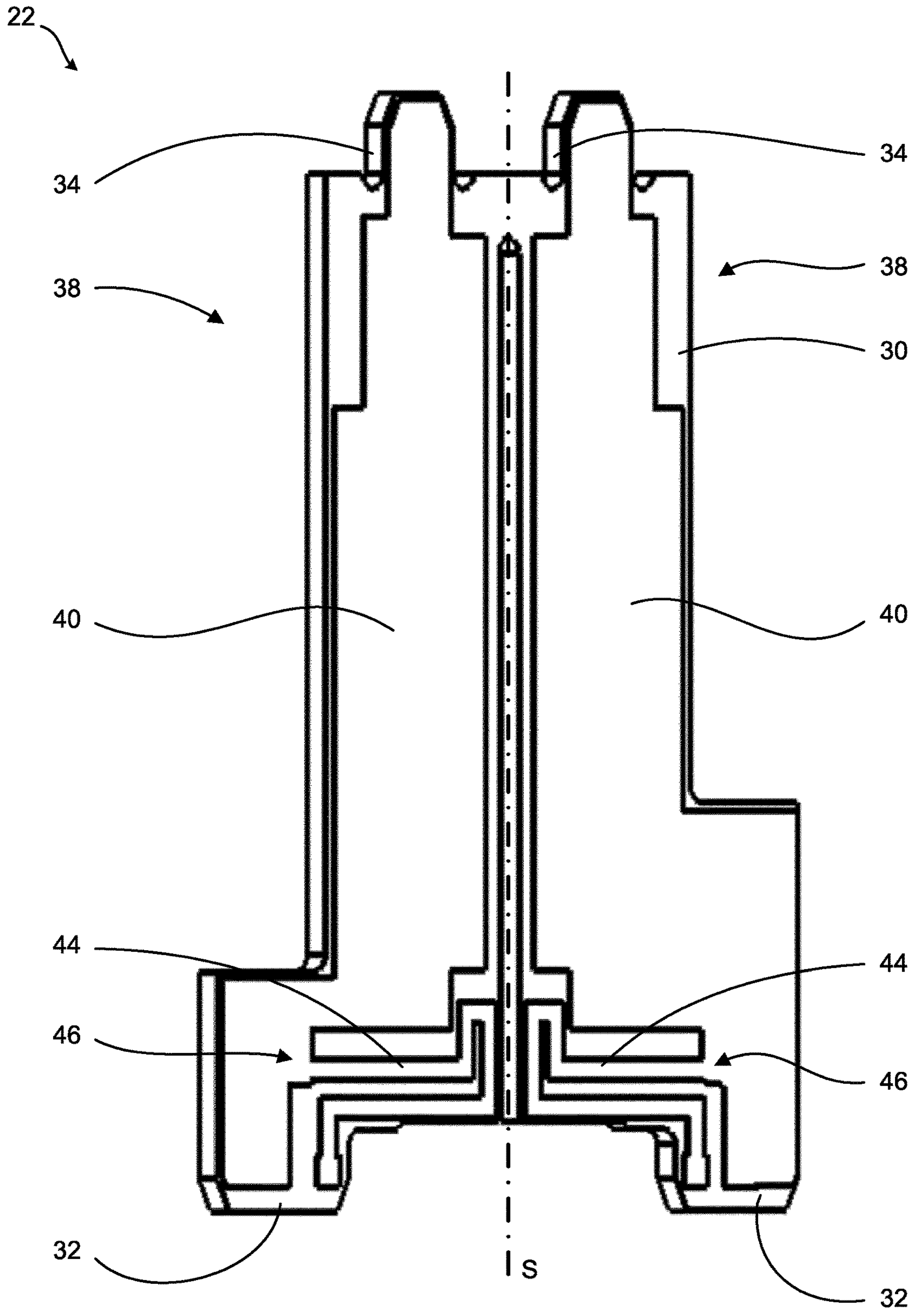

The antenna 14 comprises, besides the reflector 18, a radiator head 20, a support 22 and a balun structure 38 (FIG. 5).

The radiator head 20 comprises two radiators 24, each comprising two radiation sections 26.

The radiators 24 may be designed as known in the art. For example, the radiation sections 26 may be dipole arms so that the radiators 24 are dipoles.

Alternatively, the radiators 24 and thus the radiation sections 26 may comprise flat structures that radiate electromagnetic waves if fed within an appropriate RF-signal, for example dipole or patch radiators.

In the shown embodiment, the radiators 24 are dipole radiators where each radiation section 26 is a flat metallized structure applied to a substrate 28 of the radiator head 20.

The substrate 28 may be a PCB.

The radiators 24 are in a crossed arrangement with one another so that the radiators 24 together form a dual polarized radiator.

The radiator head 20 is mechanically connected to the reflector 18 by the support 22. Thus, the support 22 supports the radiator head 20 above the reflector 18.

The support 22 comprises two substrates 30 each having conductors applied to it. The conductors 22 form parts of the balun structure 38.

The substrates 30 may be a PCB to which a metallization forming the conductors has been applied.

The substrates 30 have a top end and a bottom end, wherein the top end is mechanically connected to the radiator head 20 and the bottom end extends through the reflector 18.

The terms "top", "bottom", "up", "down", "above", "below", or the like are used with reference to the radiation direction R of the antenna 14 and the radiator head 20 in the drawings for ease of understanding, but not to restrict the orientation of the antenna 14 when mounted in the cell site 10.

The radiation direction R is substantially perpendicular to the reflector 18.

The substrates 30 are arranged perpendicularly to one another so that the support 22 has a cross shaped cross-section.

One of the substrates 30 has a slot extending from the top end downward and the other substrate has a slot extending from the bottom end upward so that the substrates 30 can be inserted into one another.

Figure 4:
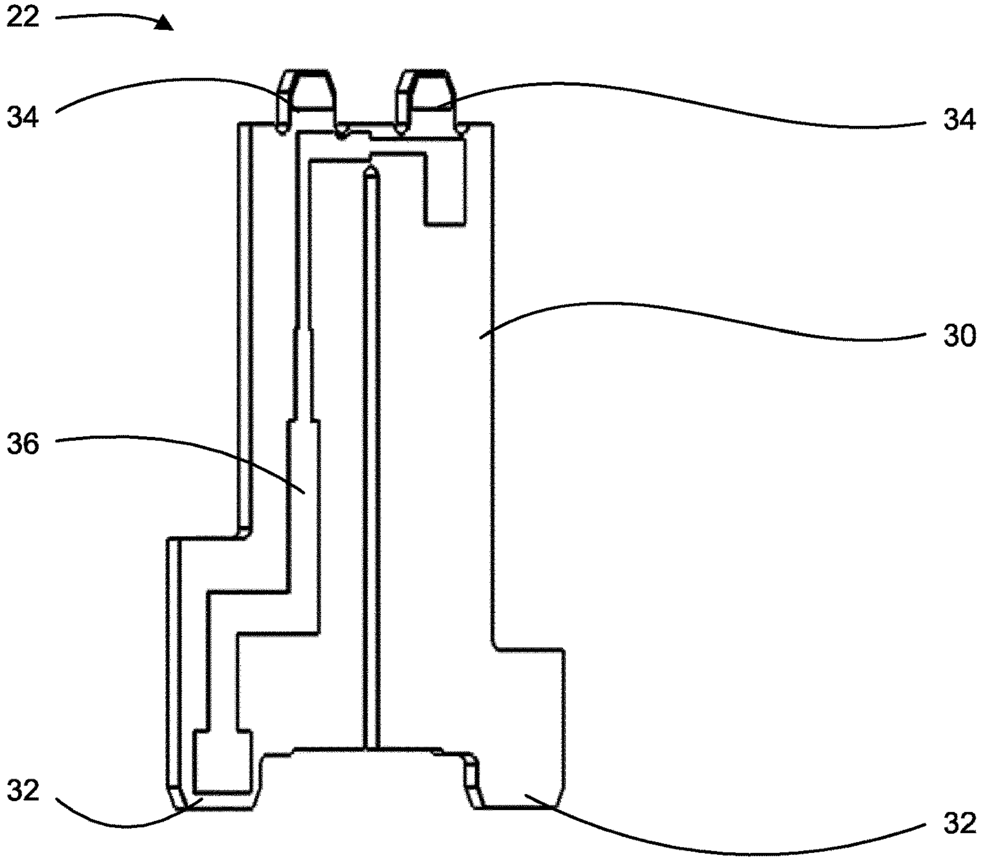

FIGS. 4 and 5 show one of the substrates 30 in side views on the different sides of the substrate 30.

Figure 9:
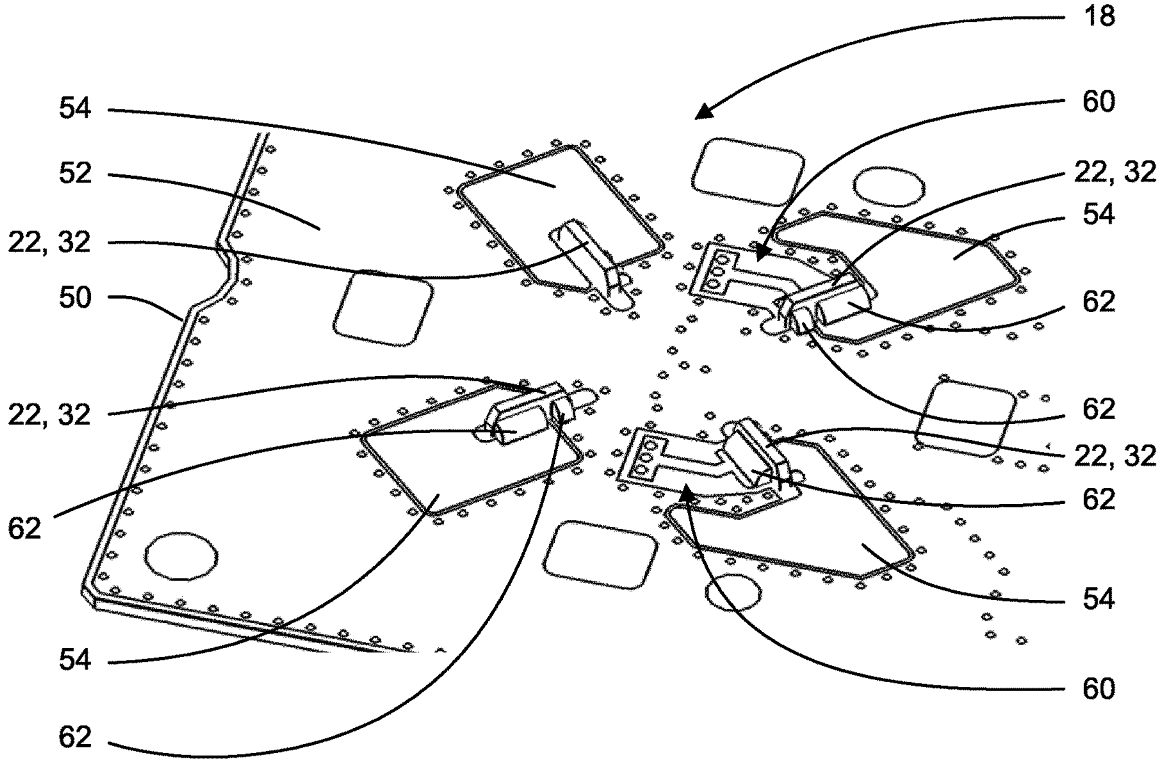
FIG. 9 shows a bottom view of the reflector like the one shown in FIG. 7 having the substrate mounted to the reflector.

The substrates 30 each have two legs 32 on the bottom end which extend through the reflector 18 in the mounted state (FIG. 9).

Each substrate 30 also comprises two tongues 34 at their top ends, wherein a tongue 34 is provided for each radiation section 26 of the radiator 24 associated with the respective substrate 30.

FIG. 4 shows the signal side of the substrate 30. On the signal side, the conductor applied is a signal line 36 extending from the bottom end, in particular from one of the legs 32, upwards to the top end.

The signal line 36 is connected to the radiation sections 26 of the same radiator 24, in particular only to the radiation sections 26 of one of the radiators 24. The connection may be formed galvanically or capacitively.

FIG. 5 shows the side of the substrate 30 opposite to the signal side, called back side in the following.

The antenna 14 comprises, for each radiator 24 one balun structure 38.

Each balun structure 38 comprises two main lines 40, two capacitances 42 (FIG. 8) and two inductive lines 44, wherein each balun structure 38 comprises two halves having one of the main lines 40, one of the capacitances 42 and one of the inductive lines 44 each. The halves are in electrical contact via the ground plane 52.

The balun structure 38 provides the symmetrization for the feeding of the radiators 24 for one polarization. The symmetrization is provided by an electrical connection of the two main lines 40 with one another. The electrical connection may be realized via the ground plane 52 and the capacitive areas 54.

The balun structure 38 in particular consists of two main lines 40, two inductive lines 44 and two capacitances 42. Thus, for a dual polarized radiator as in the shown example, two balun structures 38 combined.

In the first embodiment, the main line 40 and the inductive line 44 are provided on the substrate 30, more precisely on the back side of the substrate 30.

The back side of the substrate 30 comprises parts of the two halves of the balun structure 38 as the radiation sections 26 of the same radiator 24 are connected to the tongues 34 of the substrate 30.

The halves of the balun structure 38 on the same substrate 30 are separate from one another and each extends from one of the legs 32 to the respective tongue 34. In fact, along a centerline S from the top end to the bottom end, the balun structure 38 on the substrate 30 is line symmetric.

Figure 10:
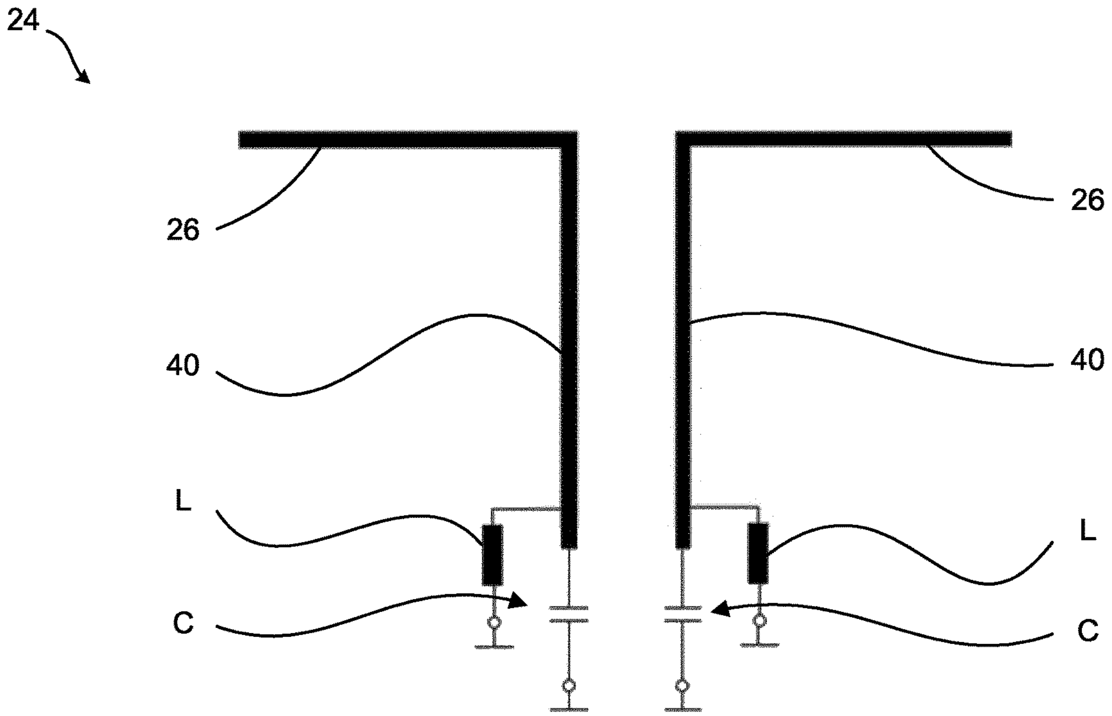
FIG. 10 shows a schematic circuit diagram representing the antenna.

For example, the capacitances 42 and the inductive line 42 are located electrically between the connection of the respective main line 40 with the respective radiation section 26, in particular the entire main line 40, and the electrical connection of the two main lines 40 (see FIG. 10).

In the following, only one of the halves of the balun structure 38 will be described.

The main line 40 of each half of the balun structure 38 extends from the top end, in particular the tongue 34, downward onto the respective leg 32 of the substrate 30, i.e. the leg 32 on the same edge as the tongue 34.

At the top end, the main line 40 is galvanically or capacitively coupled to the associated one of the radiation sections 26.

The inductive line 44 branches off the main line 40 at a branching point 46 and extends onto the same leg 32 as the main line 40.

The length of the inductive line 44 from the branching point 46 to the leg 32 is longer than the length of the main line 40 from the branching point 46 to the leg 32.

The inductive line 44 has a length of around 15 mm in the first embodiment. In general, the length of the inductive line 44 depends on the radiator geometry and radiator distance and can differ significantly. Preferably, the inductive line 44 has a minimum of 0.1 wavelengths of the center frequency of the first frequency range.

The inductive line 44 comprises a section having a hairpin-shape, thus increasing the length of the inductive line.

In addition or alternatively, the inductive line 44 may comprise a meander-shaped section.

The branching point 46 lies closer to the bottom end than to the top end of the substrate 30.

In particular, the branching point 46 lies in the lower quarter, in particular the lower fifth of the substrate 30 with respect to the distance between the top end and the bottom end excluding the tongues 34 and legs 32.

Figure 6:
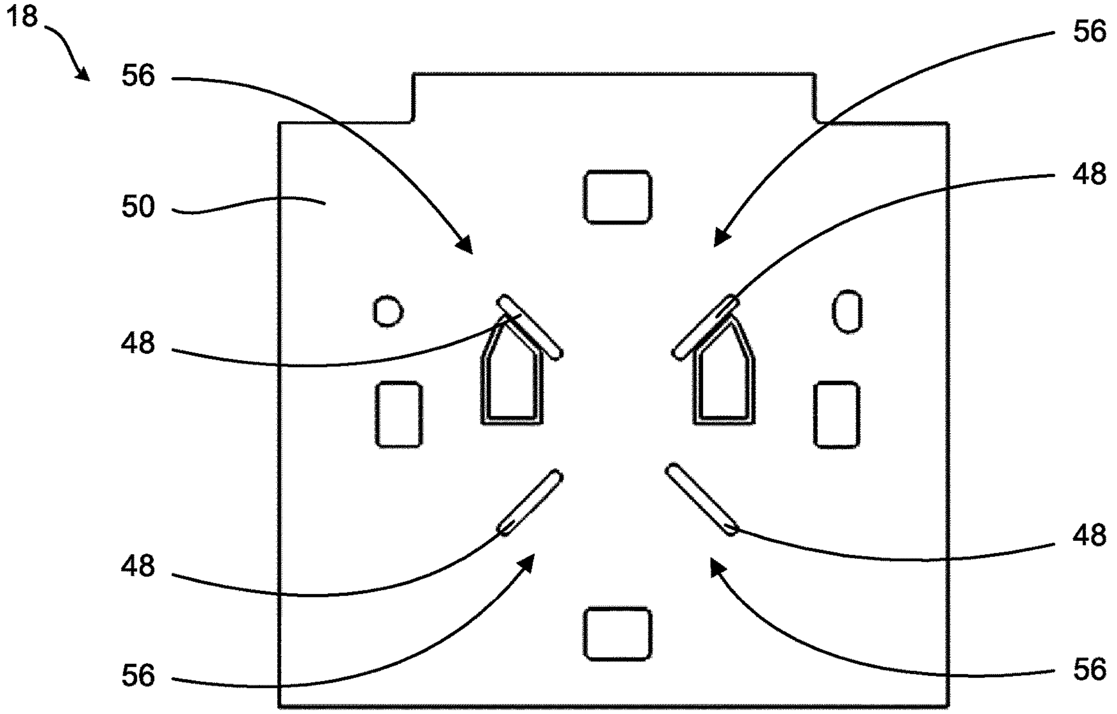
FIGS. 6, 7 show a portion of the reflector of the antenna according to FIG. 2 in a top view and a bottom view, respectively.
Figure 7:
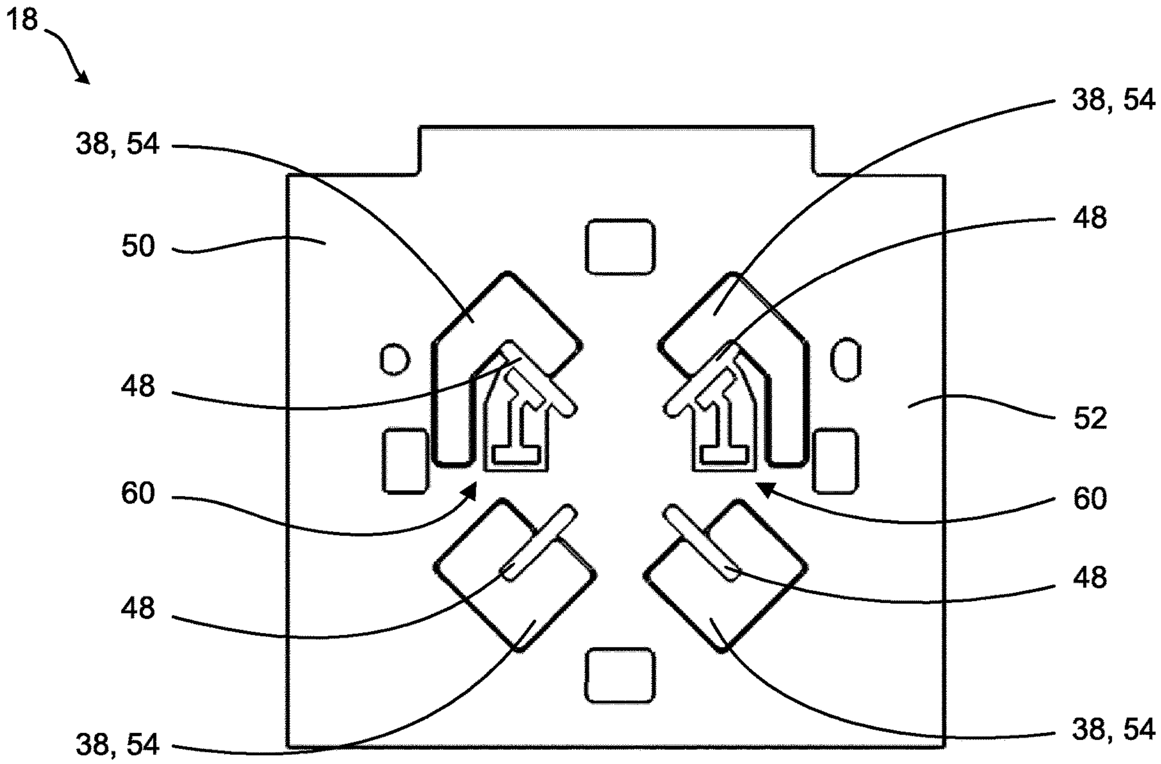

FIGS. 6 and 7 show a portion of the reflector 18 in a top view and a bottom view, respectively.

The reflector 18 has at least four openings 48 for each of the radiator heads 20, wherein through each opening 48 one of the legs 32 of the support 22 extends.

The reflector 18 also comprises a substrate 50, which may be a PCB, and conductors applied to the substrate 50.

The substrate 50 has a first side, being the bottom side in the shown embodiment, and a second side opposite the first side. The second side is thus the top side of the substrate 50 facing towards the radiator head 20.

The substrate 50 comprises a conductor serving as the ground plane 52 of the reflector 18 provided on the first side. The ground plane 52 is grounded.

Further, on the first side, i.e. the bottom side, capacitive areas 54 are provided, one adjacent to each of the openings 48.

Each one of the capacitive areas 54 is part of a different one of halves of the balun structure 38. Thus, the balun structures 38 are provided in parts on the support 22 and in parts on the reflector 18.

Figure 8:
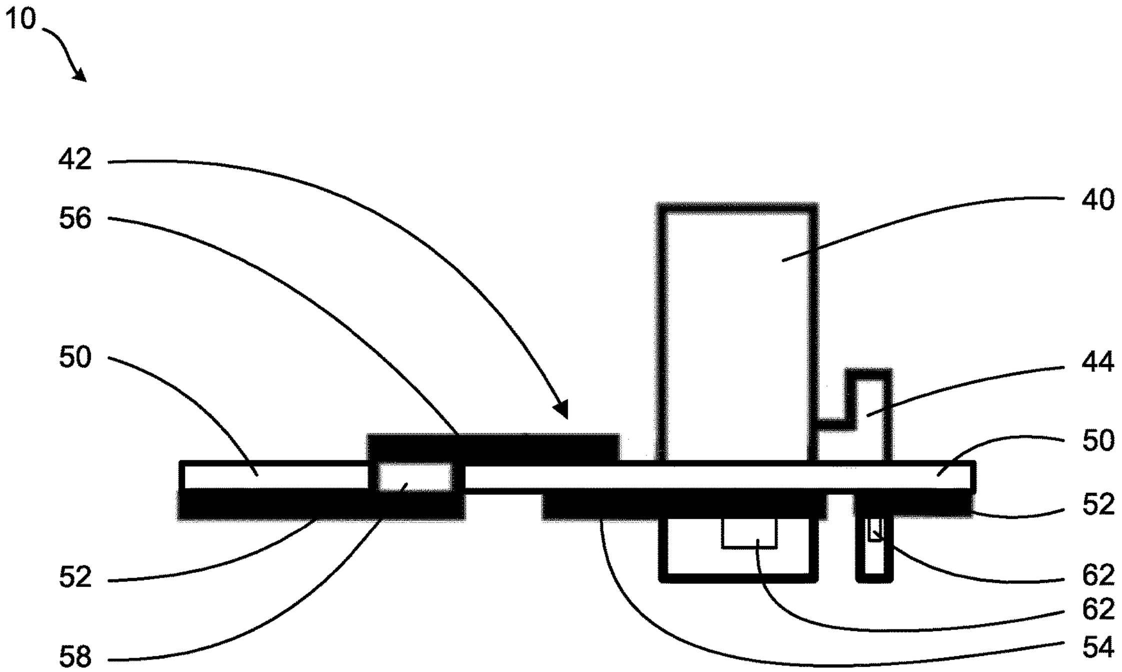
FIG. 8 shows a very schematic cross-section through the substrate of the reflector in amounted state.

FIG. 8 shows a schematic cross section of the reflector 18 in a region of an opening 48. For simplicity, only the main line 40 and the inductive line 44, but not the substrate 30 of the support 22 are shown.

The capacitive areas 54 are separate from the ground plane 52, i.e. without galvanic contact. Thus, no ground plane 52 is present in the region of a capacitive area 54.

At least in the regions of the capacitive area 54, a grounded area 56 made of a conductor, is provided on the second side of the substrate 50. The capacitive area 54 and the opposite grounded area 56 form a capacitor being the capacitance 42 of the balun structure 38.

For example, the capacitive area 54 is designed in such a way that only the signals from the first antennas 14 in the first frequency range do pass through the capacitive area 54 and the signals introduced from the second antennas 16 in the second frequency do not pass through the capacitive area 54 but through the inductive line 44.

The value of the capacitance 42 is be chosen such that its electrical reactance lies below 50Ω in particular between 10Ω and 40Ω.

For example, the capacitance 42 has a value between 2.0 and 3.0 pF for frequencies in the first frequency range.

Thus, for a thickness of the substrate 50 of 0.762 mm and a value of the capacitive area 54 of 77 $mm^2$, the capacitance 42 has a value of 2.6 pF.

The grounded area 56 is galvanically connected to the ground plane 52, in the shown embodiment through the substrate 50 by use of a via 58.

In the shown embodiment, the grounded area 56 extends over almost the entire second side of the substrate 50.

It is also conceivable that the capacitive area 54 is located on the second side of the substrate 50 of the reflector 18 and that the capacitive area 54 is capacitively coupled with the portion of the ground plane 52 present opposite to the capacitive area 54.

Further, on the first side of the substrate 50 one signal feed 60 is provided for each of the radiators 24. Thus, in the shown portion of the reflector 18, two signal feeds 60 are provided.

In the shown embodiment, the signal feed 60 are located between the capacitive areas 54 and each is adjacent to one of the openings 48.

FIG. 9 shows a bottom view of the reflector 18 with an attached support 22. In FIG. 9, the capacitive areas 42 have a slightly different shape than in FIG. 7 and the vias 58 are shown.

The legs 32 of the support 22 extend through the openings 48, thus through the reflector 18.

As the main line 40 and the inductive line 44 are both present on the legs 32, also the main line 40 in the inductive line 44 extend through the reflector 18, more precisely through the substrate 50 of the reflector 18.

The main line 40 extends through a region of the opening 48 to which the capacitive area 54 is adjacent to and the end of the inductive line 44 is located on the leg 32 such that it extends through the opening 48 at a region in which the ground plane 52 is adjacent to the opening 48.

The main line 40 and the inductive line 44 are soldered (see solder 62 in the Figures), in particular from the bottom side, to the first side of the substrate 50.

The main line 40 is soldered to the respective capacitive area 54 so that the main line 40 is in galvanic contact with the capacitive area 54.

The end of the inductive line 44 is soldered to the ground plane 52 so that the inductive line 44 is in galvanic contact with the ground plane 52 but not with the capacitive area 54.

Further, the signal feed 60 is soldered to the signal line 36 on the signal side of the substrate 30 of the support 22.

Thus, all connections can be soldered from the bottom and thus can be performed in a single step.

FIG. 10 shows a schematic circuit diagram of the antenna 14. Each of the radiation sections 26 is separately connected to the ground plane 52 via the main line 40 in two ways. Firstly, by an inductivity L provided by the inductive line 44, and secondly by a capacitance C provided by the capacitance 42.

This way, the common mode resonance frequency of the first antenna 14 is shifted so that the first natural resonance at ¼ of the wavelength of the design frequency of the first antenna 14 lies outside the second frequency range of the second antenna 16.

By using an inductive line 44 on the support 22 and a capacitance 42 on the reflector 18, a very compact design of the support 22 and thus the whole antenna 14 can be achieved. Further, no vias are necessary on the support 22, simplifying the construction.

In addition, due to the symmetry of the balun structure 38 along the centerline S and the branching point 46 in the lower quarter, a stabler radiation pattern over frequency for the radiators in the second frequency range is achieved.

Moreover, it is possible to arrange the transmission line to the signal feed 60 to run between the two capacitive areas 54 on the reflector 18. Thus, combining a plurality of radiators 24 is possible with short line lengths and low interference.

FIGS. 11 to 15 show further embodiments of the antenna according to the invention which correspond substantially to the first embodiment. Thus, only the differences are discussed in the following and the same and functionally the same components are labeled with the same reference signs.

Figure 11:
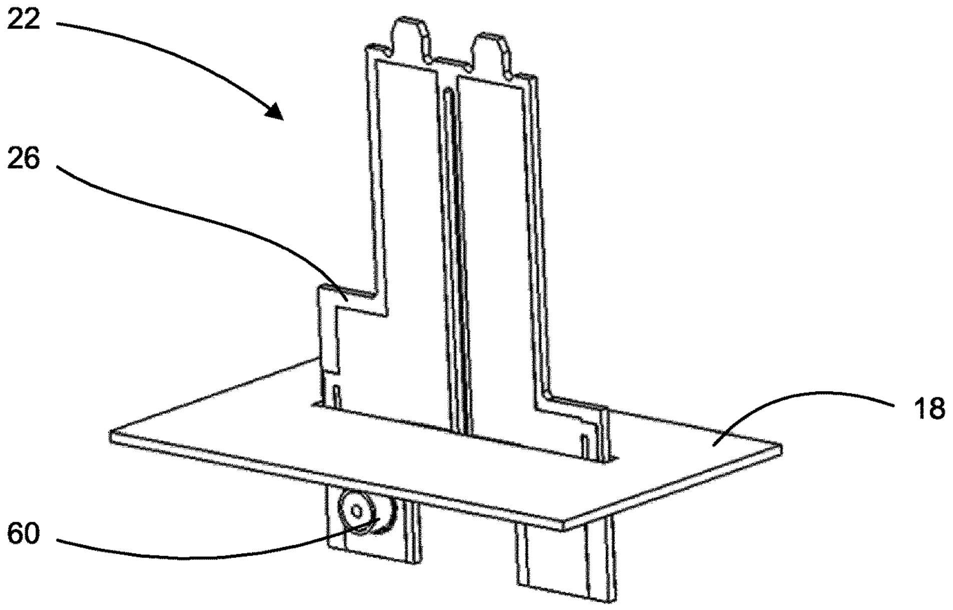
FIG. 11 shows a support and a reflector of an antenna according to a second embodiment of the invention.
Figure 12:
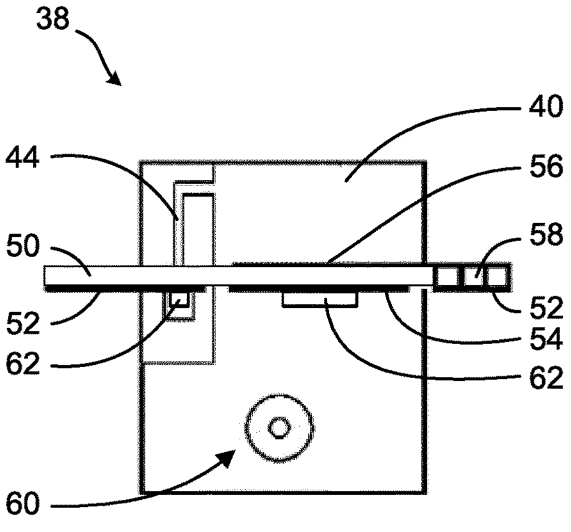
FIGS. 12, 13 show schematically the balun structure of the antenna of FIG. 11 in different side views.
Figure 13:
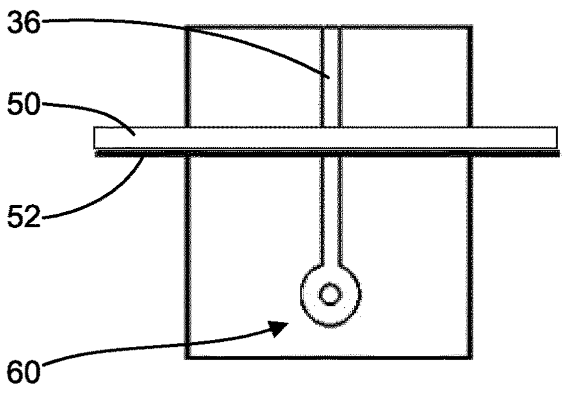

FIG. 11 shows a perspective view of the support 22 and the reflector 18 of a second embodiment of an antenna 14. FIGS. 12 and 13 depict a cross-section through the reflector 18 while showing the back side or the signal side, respectively, of the support 22.

In this second embodiment, the support 22 comprises the signal feed 60 for the radiators 24 on the portion of the substrate extending through the reflector 18, i.e. the signal feed 60 is located below the reflector 18. In particular, the main line 40 extends fully through the reflector 18 to the signal feed 60.

Each substrate 30 of the support is provided with a signal feed 60, in the shown embodiment a coaxial connection.

The inner conductor of the coaxial connection is galvanically connected to the signal line 36 of the substrate 30 and the other conductor of the coaxial connection is galvanically connected to the main line 40 on the back side of the substrate 30.

As explained with respect to the first embodiment, the main line 40 is galvanically connected, e.g. soldered (see solder 62), to a capacitive area 54 on the reflector 18.

The capacitive area 54 forms a capacitance 42 with the grounded area 56 of the reflector 18.

Figure 14:
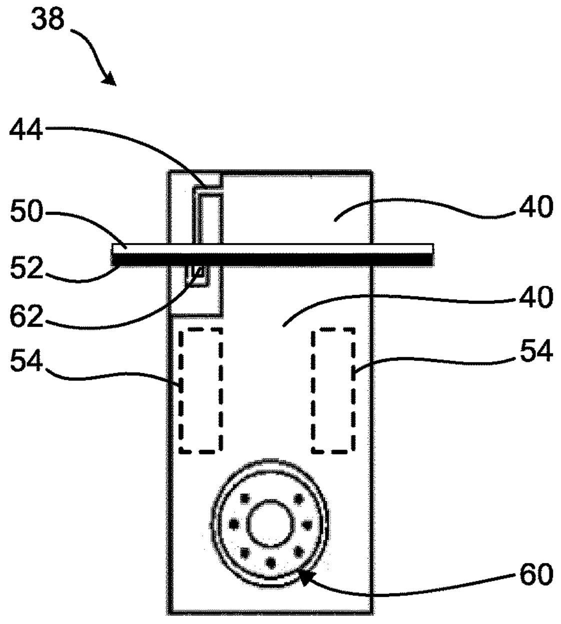
FIGS. 14, 15 show side views of the balun structure of an antenna according to a third embodiment of the invention.
Figure 15:
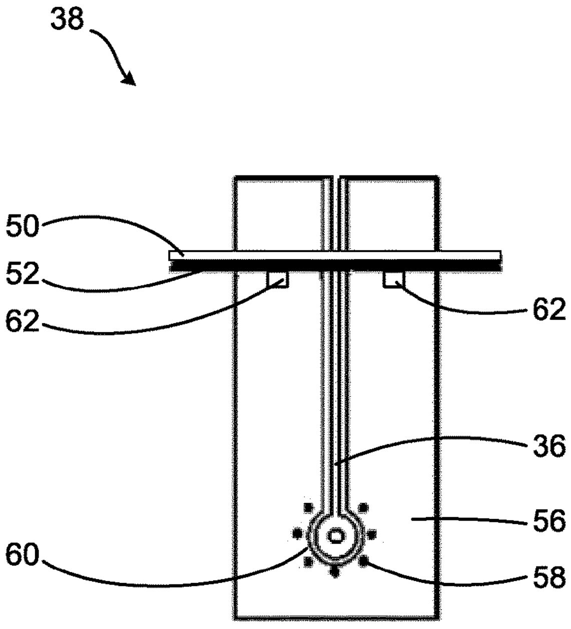

FIGS. 14 and 15 show a third embodiment of the antenna 14 corresponding substantially to the second embodiment.

The FIGS. 14 and 15 correspond to the views of FIGS. 12 and 13.

In contrast to the second embodiment, the main line 40 is not galvanically connected to the signal feed 60, i.e. the outer conductor of the coaxial connection.

In addition, the main line 40 is not galvanically connected, i.e. not soldered, to the reflector 18.

Further, in difference to the second embodiment, the grounded area 56 is provided on the signal side of the substrate 30 of the support 22. In particular, the grounded area 56 fully surrounds the signal line 36 and the signal feed 60.

In this third embodiment, the balun structure 38 is located fully on the support 22. The main line 40 thus forms the capacitance 42 with the grounded area 56 so that the capacitive area 54 can be regarded as part of the main line 40 (indicated exemplarily by dashed lines in FIG. 14).

The grounded area 56 is galvanically connected to the ground plane 52, e.g. by soldering.

The second and third embodiment further simplify the antenna 14 as the reflector 18 does not need the signal feed and can thus be simpler.

The invention claimed is:

1. An antenna for a mobile communication cell site, comprising a radiator head, a support, and a reflector, wherein the radiator head comprises at least one radiator with two radiation sections, the reflector comprises a ground plane, and the support is mounted to the reflector and supports the radiator head above the reflector, wherein a balun structure having a half for each of the radiation sections is provided on the support or in parts on the support and in parts on the reflector, wherein each of the halves of the balun structure comprises a main line, an inductive line and a capacitance, wherein the capacitance comprises a capacitive area capacitively coupled to the ground plane or capacitively coupled to a grounded area which is galvanically connected to the ground plane, wherein the main line galvanically connects the respective radiation section of the radiator to the capacitive area of the capacitance, and wherein the inductive line extends from the main line and is galvanically connected to the ground plane.

2. The antenna according to claim 1, wherein the main line and the inductive line are provided on the support and/or wherein the capacitance is provided on the reflector.

3. The antenna according to claim 1, wherein the capacitance value of the capacitance is chosen such that the electrical reactance lies below 50Ω, in particular between 10 Ω and 40 Ω.

4. The antenna according to claim 1, wherein the inductive line comprises a hairpin-shaped section and/or a meander-shaped section.

5. The antenna according to claim 1, wherein the support comprises at least one substrate, in particular a PCB, and conductors applied to the substrate, the conductors forming at least parts of, in particular the whole balun structure, in particular wherein the conductors forming at least parts of the balun structure are applied to the same side of the substrate.

6. The antenna according to claim 5, wherein the support comprises a conductor forming a signal line, wherein the signal line and the balun structure are located on opposite sides of the substrate.

7. The antenna according to claim 5, wherein the substrate of the support extends through the reflector and comprises a coaxial connection in the region below the reflector.

8. The antenna according to claim 6, wherein the grounded area is located on the support on the same side of the substrate as the signal line and wherein the capacitive area is located on the other side of the substrate of the support, in particular wherein the capacitive area is part of the main line.

9. The antenna according to claim 1, wherein the support has a top end mechanically connected to the radiator head and a bottom end mechanically connected to the reflector, wherein the inductive line branches off the main line at a branching point.

10. The antenna according to claim 9, wherein the branching point lies closer to the bottom end than to the top end, in particular the branching point lies in the lower quarter, in particular the lower fifth of the substrate.

11. The antenna according to claim 1, wherein the reflector comprises a substrate, in particular a PCB, and conductors applied to the substrate, the substrate having a first side and a second side opposite to the first side, and the conductors forming at least parts of the balun structure, wherein the ground plane is provided on the first side.

12. The antenna according to claim 11, wherein the capacitive area is provided on the first side separate from the ground plane and the grounded area is provided on the second side in a region opposite to the capacitive area.

13. The antenna according to claim 12, wherein the main line and the inductive line both extend to the first side of the reflector and/or wherein the main line and the inductive line are soldered to the first side of the reflector, in particular wherein the main line is soldered to the respective capacitive area and the inductive line is soldered to the ground plane.

14. The antenna according to claim 1, wherein the parts of the balun structure for the radiation sections of the same radiator that are provided on the support are located on the same substrate, in particular on the same side of the substrate.

15. The antenna according to claim 1, wherein the parts of the balun structure for the radiation sections of the same radiator that are provided on the reflector are located on the same substrate of the reflector.

16. The antenna according to claim 1, wherein the radiator head comprises two radiators, in particular the radiator head being a dual polarized radiator, wherein the support comprises a substrate for each one of the radiators, in particular wherein the substrates of the support are arranged perpendicular to one another.

17. The antenna array comprising a plurality of antennas each comprising a radiator head, a support, and a reflector, wherein the radiator head comprises at least one radiator with two radiation sections, the reflector comprises a ground plane, and the support is mounted to the reflector and supports the radiator head above the reflector, wherein a balun structure having a half for each of the radiation sections is provided on the support or in parts on the support and in parts on the reflector, wherein each of the halves of the balun structure comprises a main line, an inductive line and a capacitance, wherein the capacitance comprises a capacitive area capacitively coupled to the ground plane or capacitively coupled to a grounded area which is galvanically connected to the ground plane, wherein the main line galvanically connects the respective radiation section of the radiator to the capacitive area of the capacitance, and wherein the inductive line extends from the main line and is galvanically connected to the ground plane, the antennas forming a first array for a first frequency range and a plurality of antennas forming a second array for a second frequency range.

18. A mobile communication cell site comprising an antenna, the antenna comprising a radiator head, a support, and a reflector, wherein the radiator head comprises at least one radiator with two radiation sections, the reflector comprises a ground plane, and the support is mounted to the reflector and supports the radiator head above the reflector, wherein a balun structure having a half for each of the radiation sections is provided on the support or in parts on the support and in parts on the reflector, wherein each of the halves of the balun structure comprises a main line, an inductive line and a capacitance, wherein the capacitance comprises a capacitive area capacitively coupled to the ground plane or capacitively coupled to a grounded area which is galvanically connected to the ground plane, wherein the main line galvanically connects the respective radiation section of the radiator to the capacitive area of the capacitance, and wherein the inductive line extends from the main line and is galvanically connected to the ground plane.

* * * * *